(12) United States Patent
Chou et al.

(10) Patent No.: US 12,201,172 B2
(45) Date of Patent: Jan. 21, 2025

(54) ECO-FRIENDLY WEARABLE DIPPED ARTICLE AND METHOD OF MANUFACTURING

(71) Applicant: SHEN WEI (USA) INC., Union City, CA (US)

(72) Inventors: Belle L. Chou, Union City, CA (US); Sisitha Sudarshana, Homagama (LK); Ranthi Dias, Athurugiriya (LK); Samantha S. Chang, Union City, CA (US)

(73) Assignee: SHEN WEI (USA) INC., Union City, CA (US)

( * ) Notice: Subject to any disclaimer, the term of this patent is extended or adjusted under 35 U.S.C. 154(b) by 710 days.

(21) Appl. No.: 17/338,623

(22) Filed: Jun. 3, 2021

(65) Prior Publication Data

US 2022/0386720 A1 Dec. 8, 2022

(51) Int. Cl.
  *A41D 19/00* (2006.01)
  *B29C 37/00* (2006.01)
  (Continued)

(52) U.S. Cl.
  CPC ...... *A41D 19/0058* (2013.01); *B29C 37/0092* (2013.01); *B29C 41/003* (2013.01); *B29C 41/14* (2013.01); *B29C 41/46* (2013.01); *C08K 3/16* (2013.01); *C08K 3/30* (2013.01); *C08L 21/00* (2013.01); *A41D 2400/52* (2013.01); *A41D 2500/54* (2013.01); *B29K 2021/006* (2013.01); *B29K 2105/0017* (2013.01); *B29L 2031/4864* (2013.01); *C08J 5/02* (2013.01);
  (Continued)

(58) Field of Classification Search
  None
  See application file for complete search history.

(56) References Cited

U.S. PATENT DOCUMENTS

| | | | | | |
|---|---|---|---|---|---|
| 4,067,836 | A | * | 1/1978 | Potts | C08L 23/02 522/66 |
| 5,057,221 | A | * | 10/1991 | Bryant | C02F 3/1231 435/267 |

(Continued)

FOREIGN PATENT DOCUMENTS

| CN | 102826732 A | 12/2012 |
|---|---|---|
| KR | 102377872 B1 | 3/2022 |

(Continued)

OTHER PUBLICATIONS

CN 102826732 A (Lu et al) (published Dec. 19, 2012) (machine translation) (Year: 2012).*

(Continued)

*Primary Examiner* — Vivian Chen
(74) *Attorney, Agent, or Firm* — Intellectual Property Law Group LLP

(57) ABSTRACT

The present invention generally relates to an eco-friendly wearable article comprising a nutrient complex capable of efficiently able to reduce or eliminate methane gas emission during biodegradation of the article, and a method of making the eco-friendly wearable article containing the nutrient complex. Preferably, the nutrient complex typically comprises anionic sulphate ions and cationic salts of iron(II) and copper(II), thereby facilitating methane oxidation in an anaerobic environment such as a landfill.

16 Claims, 5 Drawing Sheets

(51) Int. Cl.

| | | |
|---|---|---|
| *B29C 41/00* | (2006.01) | |
| *B29C 41/14* | (2006.01) | |
| *B29C 41/46* | (2006.01) | |
| *B29K 21/00* | (2006.01) | |
| *B29K 105/00* | (2006.01) | |
| *B29L 31/48* | (2006.01) | |
| *C08J 5/02* | (2006.01) | |
| *C08J 7/048* | (2020.01) | |
| *C08K 3/16* | (2006.01) | |
| *C08K 3/30* | (2006.01) | |
| *C08L 21/00* | (2006.01) | |

(52) U.S. Cl.
    CPC ............ *C08J 7/048* (2020.01); *C08J 2309/04* (2013.01); *C08J 2321/02* (2013.01); *C08J 2421/02* (2013.01); *C08K 2003/3063* (2013.01); *C08K 2003/3072* (2013.01); *Y02C 20/20* (2013.01)

(56) References Cited

U.S. PATENT DOCUMENTS

| | | | | |
|---|---|---|---|---|
| 5,108,807 | A * | 4/1992 | Tucker | B32B 27/306 523/124 |
| 5,216,043 | A * | 6/1993 | Sipinen | C08K 5/09 523/125 |
| 5,258,422 | A * | 11/1993 | Chang | C08K 5/0033 524/394 |
| 6,391,409 | B1 | 5/2002 | Yeh et al. | |
| 8,071,342 | B2 | 12/2011 | Herrema et al. | |
| 2006/0141186 | A1 * | 6/2006 | Janssen | C08J 7/046 428/521 |
| 2009/0124778 | A1 | 5/2009 | Ueda | |
| 2010/0138978 | A1 * | 6/2010 | Ikeda | C08L 11/02 2/168 |
| 2010/0255540 | A2 * | 10/2010 | Herrema | C12P 7/62 435/189 |
| 2013/0018125 | A1 * | 1/2013 | Matsuo | C08K 3/012 252/186.1 |
| 2013/0149755 | A1 * | 6/2013 | Reed | C12P 7/6463 204/278 |
| 2014/0065311 | A1 | 3/2014 | Moseley et al. | |
| 2015/0037865 | A1 * | 2/2015 | Weder | D21H 23/22 428/17 |
| 2016/0024333 | A1 * | 1/2016 | Richards | D06M 15/564 442/152 |
| 2017/0071271 | A1 * | 3/2017 | Megat Abdul Aziz | A41D 19/0075 |
| 2017/0135425 | A1 * | 5/2017 | Hao | A61B 42/10 |
| 2017/0218407 | A1 * | 8/2017 | Reed | C12P 7/40 |
| 2017/0256681 | A1 * | 9/2017 | Liao | H01L 33/42 |
| 2018/0332910 | A1 * | 11/2018 | Modha | B32B 25/08 |
| 2019/0029342 | A1 | 1/2019 | Foo et al. | |
| 2023/0337769 | A1 * | 10/2023 | Kariyapperuma | C09D 7/61 |

FOREIGN PATENT DOCUMENTS

| | | |
|---|---|---|
| WO | WO 2010/046789 A1 | 4/2010 |
| WO | WO 2021/171994 A1 | 9/2021 |

OTHER PUBLICATIONS

KR 102377872 B1 (Choo) (published Mar. 24, 2022) (machine translation) (Year: 2022).*

Widdel et al. "Anaerobic Biodegradation of Hydrocarbons Including Methane", Chapter 1.33, Prokaryotes (2006) 2:1028-1049 (total 22 pages).

Markowska-Szczupak et al., "Biosynthesis of methanol from methane by Methylosinus trichosporium OB3b", Chemical Papers—Slovak Academy of Sciences, 63(2) 105-110, Jan. 2009 (total 7 pages).

Rolere et al., "The majority of minerals present in natural rubber are associated with the macrogel: An ICP-MS and SEM/EDX investigation", Journal of Applied Polymer Science, Nov. 2015, pp. 1-11 (total 12 pages).

Ross et al., "A tale of two methane monooxygenases", J Biol Inorg Chem (2016) (total 13 pages).

Clesceri et al., "Standard Methods for the Examination of Water and Wastewater", 20th edition, APHA , AWWA, WEF, 1999, entire document (total 2671 pages), (1999).

International Search Report, dated of Sep. 13, 2022, for corresponding International Application No. PCT/US2022/031630 (2 pages).

Written Opinion of the International Searching Authority, dated Sep. 13, 2022, for corresponding International Application No. PCT/US2022/031630 (4 pages).

* cited by examiner

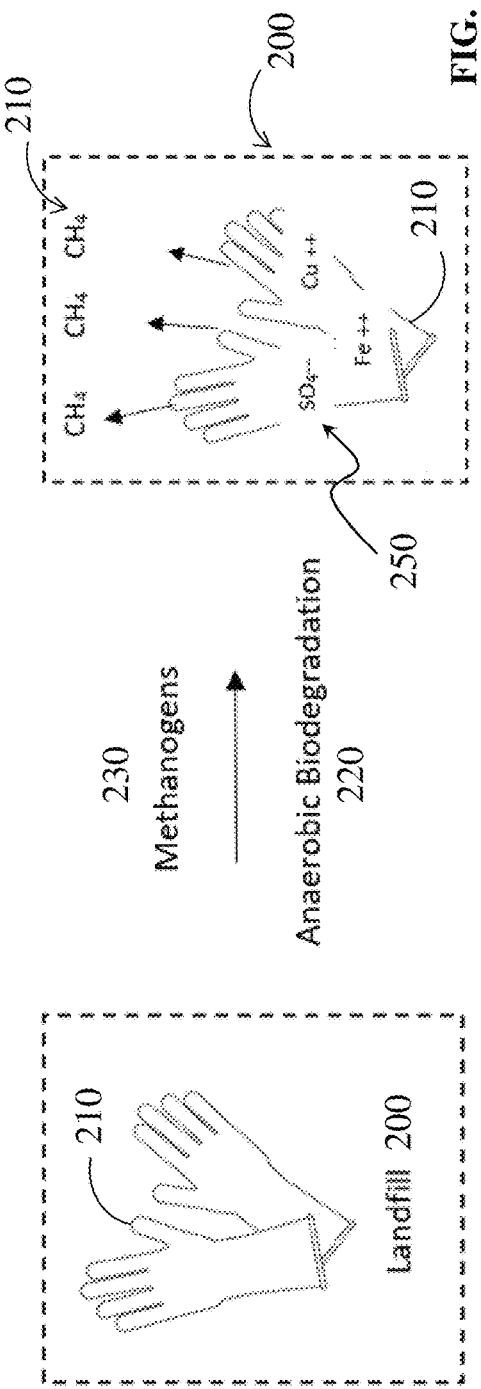
FIG. 2A
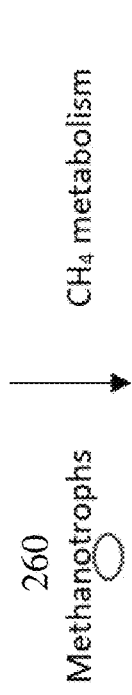
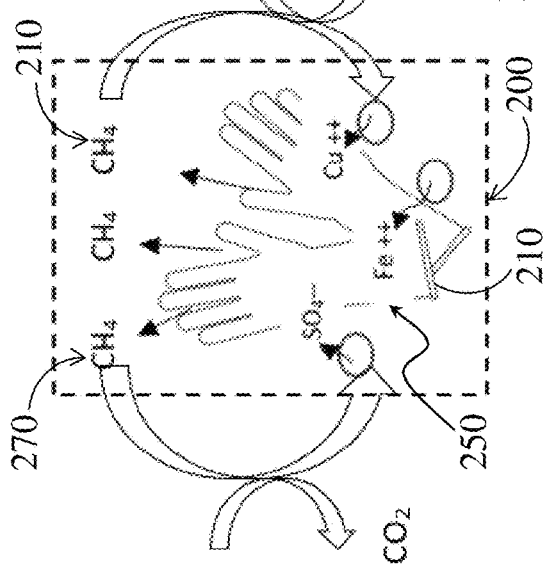
FIG. 2B
FIG. 2C

ECO-FRIENDLY WEARABLE DIPPED ARTICLE AND METHOD OF MANUFACTURING

FIELD OF THE INVENTION

The present invention relates to an article that can suppress methane emission present during anaerobic biodegradation of the article after disposal (for example, landfill).

BACKGROUND OF THE INVENTION

With the escalating efforts to reduce climate change risk, demands to reduce gaseous emissions containing methane from decomposing trash in landfills are being sought after that are efficient, safe and low cost.

Annually, tons of elastomeric articles, are collected in landfills contributing to methane gas emission present during the biodegradation process of these articles which can contribute to a greenhouse effect. Methane typically is known as a strong greenhouse gas 28 times more potent than carbon dioxide, and landfills are known to be one of the major anthropogenic sources of atmospheric methane.

This greenhouse effect from methane emissions has become so detrimental that the U.S. Environmental Protection Agency has required some larger facility landfill operators to install gas collection systems. Traditional methods to reduce methane from gaseous emissions in landfills typically involve capturing these gaseous emissions by inserting vertical wells into waste collected in these landfills, followed by vacuum pressure to draw the gas. Typically, the gaseous emissions can be processed and the methane can be converted to energy. There are disadvantages associated with this since during continuous opening and closing of the landfill to receive waste, a vacuum seal can be difficult to be obtained, thus making a vacuum draw ineffective releasing the methane into the atmosphere.

Recently, more efficient efforts to reduce or eliminate gaseous emissions comprising methane from landfills have been sought after. Methods and processes to treat these gaseous emissions and reduce methane concentration presently have focused on capturing, collecting and drawing these gaseous emissions containing methane into bioreactors. In order to overcome the aforementioned limitations, methanotropic microorganisms have been incorporated into these bioreactors and have been shown to be promising. Methanotrophic organisms offer tremendous advantages in bioreactors due to their ability to use the methane from these gaseous emissions as a source of carbon or energy, and can produce useful end products such as polymers which can then be used to synthesize various types of biodegradable materials making this method, particularly attractive.

However, there are disadvantages associated with this treatment. The collection of landfill gas utilizes equipment, such as landfill gas extraction wells and blowers that are typically employed to draw the gaseous emissions from the landfill, typically uses sophisticated equipment, which can be expensive. A further disadvantage is the time and cost to provide purified and disinfected oxygen in order to achieve an aerobic environment to oxidize methane. Additionally, bioreactors that are typically utilized require large volumes (for example, 10,000-800,00 liters) of growth medium containing suspended methanotrophic microorganisms. Furthermore, growth culture medium could require constant monitoring and replacement every 24-96 hours to minimize the possibility of hindering microorganism growth.

Thus, although the above-mentioned processes can treat the methane in gaseous emissions, they can be time consuming and costly to continuously sustain over time.

Other approaches have been to develop eco-friendly products by incorporating materials or products such as biodegradable agents, in for example, plastic or rubber gloves. However, these products have not been seen to efficiently be able to reduce or eliminate methane gas emission during biodegradation of the product resulting in methane emission into the atmosphere.

For the foregoing reasons, there exists a need to find a solution to treat methane from gaseous emissions that are present from disposing elastomeric articles that are overflowing in landfills that are efficient, low cost, safe and effective.

These features, advantages and other embodiments of the present invention are further made apparent, in the remainder of the present description, appended claims and drawings, to those of ordinary skill in the art.

SUMMARY

The present invention is directed to an eco-friendly wearable article and a method of making. According to an embodiment of the present invention, the eco-friendly wearable article comprises a nutrient complex, and the method of making includes a coagulant dipping system comprising the nutrient complex; wherein the nutrient complex is capable of efficiently able to reduce or eliminate methane gas emission during biodegradation of this article.

In an embodiment of the present invention, the nutrient complex comprises anionic sulphate ions and cationic salts of iron(II) and copper(II). In an embodiment of the present invention, ferrous sulphate, is present in a concentration of at least 0.009 µg/cm$^2$, cupric chloride is present in a concentration of at least 0.003 µg/cm$^2$, and magnesium sulphate is present in a concentration of at least 0.083 µg/cm$^2$.

According to a preferred embodiment of the present invention, the coagulant dipping system can further comprise a cation salt comprising calcium chloride. The calcium chloride can be present in a molar concentration from about 1.5 M to about 3.75 M.

According to an embodiment of the present invention, the eco-friendly wearable article is an elastomeric article comprising an elastomeric material. Preferably, the elastomeric material is selected from a group consisting of vinyl, acrylonitrile, natural rubber latex, polyvinyl chloride, polyurethane, chloroprene, neoprene, synthetic polyisoprene rubber, silicon emulsion, and butadiene.

In an embodiment of the present invention, a method for making an eco-friendly wearable article is provided; the method comprising the steps of: a) providing a mold of the article; b) dipping the mold into the coagulant dipping system comprising the nutrient complex; c) dipping in an elastomeric mixture, forming an elastomeric layer; d) repeating steps b) and c) with multiple applications of the coagulant, to form an elastomeric layer comprising the nutrient complex; e) drying the elastomeric layer; f) dipping the elastomeric layer into a donning coating to form a donning coated elastomeric layer; g) curing the donning coated elastomeric layer; and h) drying the donning coated elastomeric layer to form the eco-friendly wearable article.

Preferably, the nutrient complex comprises a cationic salt and anionic salt comprising cations and anions respectively. More preferably, the cations comprise ferrous, copper, magnesium and the anions comprise sulphate.

In a preferred embodiment of the present invention, the cationic salt comprises ferrous sulphate, cupric chloride and magnesium sulphate.

In yet an alternative embodiment of the present invention, the method can further comprise the step of spraying the elastomeric layer with a phyllosilicate clay mineral. The phyllosilicate clay mineral is montmorillonite (MMT) in the present invention. Preferably, the phyllosilicate clay mineral is present in a total solid content between about 2.0% to about 4.5%.

According to an embodiment of the present invention, the elastomeric mixture is selected from a group consisting of vinyl, acrylonitrile, natural rubber latex, polyvinyl chloride, polyurethane, chloroprene, neoprene, synthetic polyisoprene rubber, silicon emulsion, and butadiene. Preferably, the donning coating includes the nutrient complex.

In an embodiment of the present invention, the drying steps occur at a temperature from about 60° C. to about 80° C.

In accordance with an embodiment of the present invention, the curing step is at a temperature between about 100° C. to about 110° C.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 2A illustrates an example of an eco-friendly wearable article in a landfill; according to an embodiment of the present invention.

FIG. 2B illustrates an example of an eco-friendly wearable article undergoing anaerobic biodegradation in a landfill by methanogenic bacteria, producing methane gas ($CH_4$); according to an embodiment of the present invention.

FIG. 2C illustrates an example of an in-situ methane oxidation within an eco-friendly elastomeric article—methanotrophic bacteria present in a landfill utilize methane gas (CH4) as their carbon source metabolizing to carbon dioxide ($CO_2$) utilizing a nutrient complex comprising iron (II), copper (II) and sulphate ($SO_4^{2-}$) present in the eco-friendly elastomeric article; according to an embodiment of the present invention.

These and other features, aspects, and advantages of the present invention will become better understood with reference to the following description.

DETAILED DESCRIPTION OF EMBODIMENTS

The description and the drawings of the present disclosure focuses on one or more preferred embodiments of the present invention, and describe exemplary optional features and/or alternative embodiments of the present invention. The description and drawings are for the purpose of illustration and not limitation. Those of ordinary skill in the art would recognize variations, modifications and alternatives which are also within the scope of the invention.

The present invention addresses the aforementioned need for the reduction of methane emission from an article that is undergoing a biodegradation process in an anaerobic environment. In the descriptions presented below, the present invention generally relates to an eco-friendly wearable article comprising a nutrient complex capable of efficiently able to reduce or eliminate methane gas emission during biodegradation of the article, and a method of making the eco-friendly wearable article containing the nutrient complex. Preferably, the nutrient complex typically comprises cation and anion salts, thereby facilitating methane oxidation in an anaerobic environment such as a landfill.

As used herein, the term "article" refers to an article that is eco-friendly. It is known to those skilled in the art that the term "eco-friendly" refers to products that do not harm the environment whether in production, use or disposal, and is biodegradable.

In a preferred embodiment of the present invention, methane oxidation using a microbial process is built into the eco-friendly wearable article itself, bypassing the need of a complex treatment process for methane oxidation. The present invention focuses to reduce the methane emission from the article source itself, in an anaerobic situation such as, for example, a landfill. Preferably, the eco-friendly wearable article of the present invention, will utilize resources naturally present within the landfill, rather than using a complex downstream process thus avoiding additional and costly supplies required.

In an embodiment of the present invention, composition of the eco-friendly wearable article comprises a nutrient complex, which is favorable to methanotrophs naturally present in the landfill. It is well known to those skilled in the art, that methanotrophs are microorganisms typically present in landfills and other environments where they consume methane as their sole carbon and energy source.

The nutrient complex included within the eco-friendly wearable article preferably will be adequate to provide support for methane metabolism by methanotrophs throughout the biodegradation of the article i.e. nutrition provided within the article is adequate to utilize by methanotrophs to oxidize/consume the emitted methane gas during the lifetime of the article, in the landfill.

Figure 1A:
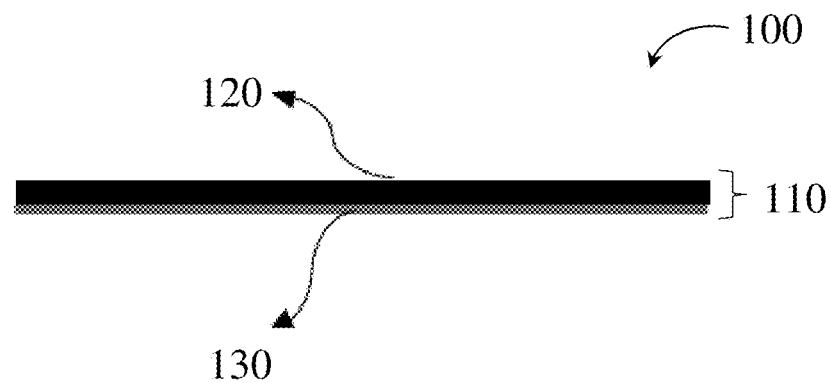
FIG. 1A illustrates a structure of an eco-friendly wearable article having an outside surface and inside surface; according to an embodiment of the present invention.

Referring now to FIG. 1A, a structure of a preferred embodiment of the present invention, an eco-friendly wearable article 100 includes at least a layer 110 having an outside surface 120 and inside surface 130 is provided. The inside surface 130 refers to a surface of the article that can be a proximal to the wearer or faces the wearer's skin when worn by a user. The outside surface 120 refers to the surface of the eco-friendly wearable article that can be distal to or faces the external environment from the wearer. Typically, the layer 110 can be made from any polymer elastomeric material known to those skilled in the art.

In an embodiment of the present invention, the eco-friendly article 100 comprises a nutrient complex. Preferably the nutrient complex comprises cationic and anionic salts. The cationic salt can be a salt known to those skilled in the art favorable to methanotrophs and capable of facilitating methane oxidation during biodegradation of the eco-friendly wearable article 100. Typical cations that can be used in the nutrient complex can be ferrous, cupric and magnesium cations. In accordance with the present invention, the anion typically comprises sulphate ions, favorable to methanotrophs and capable of facilitating methane oxidation during biodegradation of the eco-friendly wearable article 100.

Figure 1B:
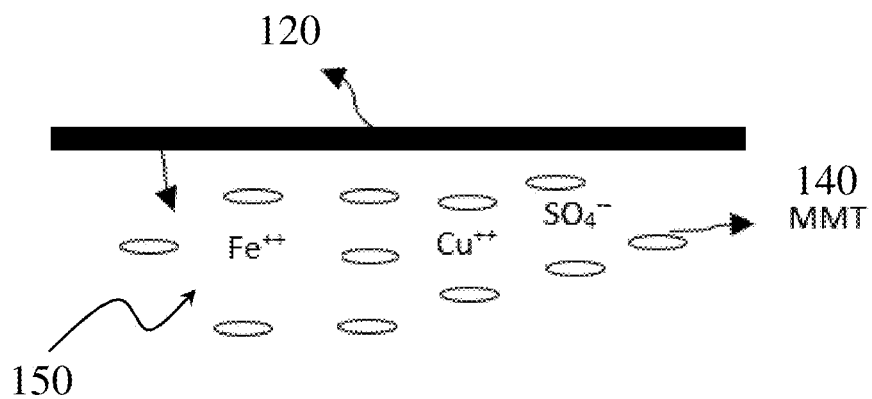
FIG. 1B illustrates an example of the outside surface of an eco-friendly wearable article, comprising phyllosilicate clay mineral, montmorillonite (MMT) within an elastomeric polymer matrix, and cations and anions in a nutrient complex; according to an embodiment of the present invention.

FIG. 1B illustrates an example of the outside surface 120 of the eco-friendly wearable article, comprising montmorillonite (MMT) clay molecules 140 within an elastomeric polymer matrix, and cations and anions from a nutrient complex 150; according to an embodiment of the present invention. In a preferred embodiment of the present invention, the nutrient complex 150 comprises a cationic and anionic salt. More preferably, the nutrient complex 150 is made of anionic sulphate ions and cationic salts of iron(II) and copper(II). In a most preferred embodiment of the present invention, the nutrient complex 150 is readily available to methanotrophs when the article is disposed on a landfill. Preferably, the anions and cations from the nutrient complex are present as free ions such that they are readily available on a surface of the article, to interact with methanotrophs during biodegradation. In a preferred embodiment of the invention, the nutrient complex 150 comprises ferrous sulphate, cupric chloride and magnesium sulphate. According to an embodiment of the present invention, for the purpose of the methane reduction function, ferrous and copper cations and sulphate ions are required. Preferably, the addition of sulphate anions is accomplished through the addition of magnesium sulphate (as is well known to those skilled in the art that the addition of ferrous sulphate in excess may exhibit toxic effects that might occur to the methanotrophs). Additionally, it is also well known to those skilled in the art that magnesium typically has no functionality towards methane reduction by methanotrophs).

In a preferred embodiment of the present invention, the nutrient complex 150 comprises ferrous sulphate present in a concentration of at least 0.009 $\mu g/cm^2$, cupric chloride present in a concentration of at least 0.003 $\mu g/cm^2$, and magnesium sulphate present in a concentration of at least 0.083 $\mu g/cm^2$.

In an alternative preferred embodiment of the present invention, if the eco-friendly wearable article is invertible, such as for example, a disposable glove, the inner most surface 130 of the article 100 preferably is treated with the nutrient complex 150, in order to make the nutrient complex 150 readily accessible to methanotrophs in the landfill, because the article 100 will be turned inside out when disposed.

Figure 1C:
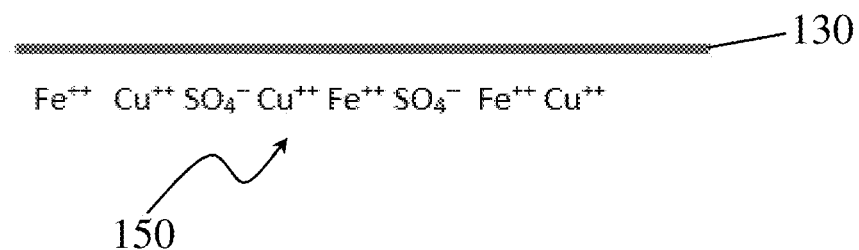
FIG. 1C illustrates and example of the inside surface of an eco-friendly wearable article, comprising a donning coating containing cations and anions in a nutrient complex; according to an embodiment of the present invention.

As illustrated in FIG. 1C an example of the inside surface 130 of an eco-friendly wearable article, comprising a donning coating containing cations and anions in a nutrient complex 150; according to an embodiment of the present invention. In a preferred embodiment of the present invention, the nutrient complex 150 comprises a cation salt. More preferably, the nutrient complex 150 comprises anionic sulphate ions and cationic salts of ferrous and cupric (iron (II) and copper(II)) wherein, the nutrient complex 150 is readily available to methanotrophs when the article is disposed on a landfill. In a preferred embodiment of the invention, the nutrient complex comprises ferrous sulphate, cupric chloride and magnesium sulphate.

In a preferred embodiment of the present invention, the nutrient complex 150 comprises ferrous sulphate present in a molar concentration from about $4 \times 10^{-6}$ M to about $40 \times 10^{-6}$ M; cupric chloride is present in a molar concentration from about $1 \times 10^{-6}$ M to about $10 \times 10^{-6}$ M; and magnesium sulphate is present in a molar concentration from about $6 \times 10^{-2}$ M to about $2.4 \times 10^{-1}$ M.

More preferably, the nutrient complex 150 comprises ferrous sulphate present in a molar concentration of $20 \times 10^{-6}$ M; cupric chloride present in a molar concentration of $5 \times 10^{-6}$ M; and magnesium sulphate present in a molar concentration of $1.2 \times 10^{-1}$ M.

Typically, the eco-friendly wearable article 100 can be an elastomeric article and may include but are not limited to disposable gloves, diapers, films, sheets, bandages, condoms, incontinence devices and other personal skin protective articles. For example, according to embodiments, the disposable gloves/articles include single-use, fluid-impermeable, protective examination gloves/articles. The elastomeric article can be made of an elastomeric material selected from a group consisting of vinyl, acrylonitrile, natural rubber latex, polyvinyl chloride, polyurethane, chloroprene, neoprene, synthetic polyisoprene rubber, silicon emulsion, and butadiene.

Preferably, the eco-friendly wearable article is a disposable glove.

In embodiments of the present invention, FIGS. 2A-2C illustrate example of an eco-friendly wearable article, for example an elastomeric article such as a disposable glove 210 in a landfill 200 (FIG. 2A) undergoing anaerobic biodegradation 220.

Referring now to FIG. 2B, an example of an eco-friendly wearable article, i.e., a disposable glove 210 comprising a nutrient complex 250 undergoing anaerobic biodegradation 220 in a landfill 200 by methanogens 230, producing methane gas ($CH_4$) 240; according to an embodiment of the present invention. Methanogens are known to those skilled in the art as methanogenic bacterium or anaerobic methane-producing bacterium, which are known to reduce carbon dioxide to methane.

FIG. 2C illustrates an example of an in-situ methane oxidation within an eco-friendly elastomeric article 210 with methanotrophic bacteria 260 present in a landfill 200 utilizing methane gas ($CH_4$) 270 as its carbon source metabolizing to carbon dioxide ($CO_2$) utilizing a nutrient complex 250 comprising iron (II), copper (II) and sulphate ($SO_4^{2-}$) ions present in the eco-friendly elastomeric article 210; according to an embodiment of the present invention.

In a preferred embodiment of the present invention, the nutrient complex 250 comprises ferrous sulphate present in a concentration of at least 0.009 $\mu g/cm^2$, cupric chloride present in a concentration of at least 0.003 $\mu g/cm^2$, and magnesium sulphate present in a concentration of at least 0.083 $\mu g/cm^2$.

In yet another preferred embodiment of the present invention, the coagulant dipping system used to make the eco-friendly wearable article, can further comprise a cation salt comprising calcium chloride. Typically, calcium chloride is present in a molar concentration from about 1.5 mol/L to about 3.75 mol/L.

In a typical embodiment of the present invention, once the article of the present invention is exposed to the landfill environment either in aerobic or anaerobic condition at the disposal, methanotrophs can utilize the nutrient complex and thereby, increase activity of enzymes, particulate methane monooxygenase (pMMO) and soluble methane monooxygenase (sMMO) to effectively oxidize methane gas which is released by the eco-friendly wearable article of the present invention during biodegradation.

It is known to those skilled in the art that during aerobic conditions, typically the first step in methanotroph metabolism is the oxidation of methane to methanol, which can be catalyzed by methane monooxygenases (MMOs). Methanotrophs can produce two genetically unrelated MMOs: soluble MMO (sMMO) expressed by a subset of methanotrophs and membrane bound, particulate MMO (pMMO) expressed by nearly all methanotrophs. These enzymes can activate the very strong C—H bond of methane (105 kcal/mol) at ambient temperature and pressure.

It is known to those skilled in the art, that during anaerobic conditions, typically anaerobic methanotrophs use sulphates and nitrates as terminal electron acceptors. Anaerobic methane oxidizers (ANME, bacteria like single cell microbes) and sulfate-reducing bacteria, can be catalyzed by a methyl-coenzyme M reductase.

$CH_4 + SO_4^{2-} \rightarrow HCO_3^- + HS^- + H_2O$

Sulfate-dependent, denitrification-dependent and iron-dependent methanotrophs have been known to those skilled in the art, to contribute to anerobic methane oxidation.

In accordance with an embodiment of the present invention, according to the specific optimized nutrient complex in the eco-friendly wearable article, both aerobic and anaerobic methanotrophs can effectively utilize the nutrient complex and can increase their metabolic pathways to consume methane available in the landfill.

In yet another embodiment of the present invention, an eco-friendly wearable article is provided. This article typically is made of an elastomeric polymer matrix composed of a nutrient complex capable of efficiently able to reduce or eliminate methane gas emission during biodegradation of the article. Typically, the nutrient complex typically comprises anionic sulphate ions and cationic salts of iron(II) and copper(II). In yet another embodiment of the present invention, the article further comprises an inside surface donning coating, treated with the nutrient complex.

Preferably, the nutrient complex provides essential elements, such as the preferred cation salts, to methanobacteria present in a landfill, to assist with methane metabolism during biodegradation of the article, thus reducing methane emission from the article itself.

In accordance with an embodiment of the present invention, in an anaerobic landfill environment, anaerobic methanotrophic bacteria oxidizes methane. In a preferred embodiment, the nutrient complex contains sulphate ($SO_4^{2-}$) ions present in the article that can act as terminal electron acceptors to facilitate the biochemical reactions during the oxidation of methane.

In an alternative embodiment of the present invention, landfills that have an aerobic environment, aerobic methanotrophs can utilize iron(II) and copper(II) ions from the nutrient complex in the article and thereby, can increase their enzyme activity (pMMO, sMMO) to effectively oxidize methane gas.

Figure 3:
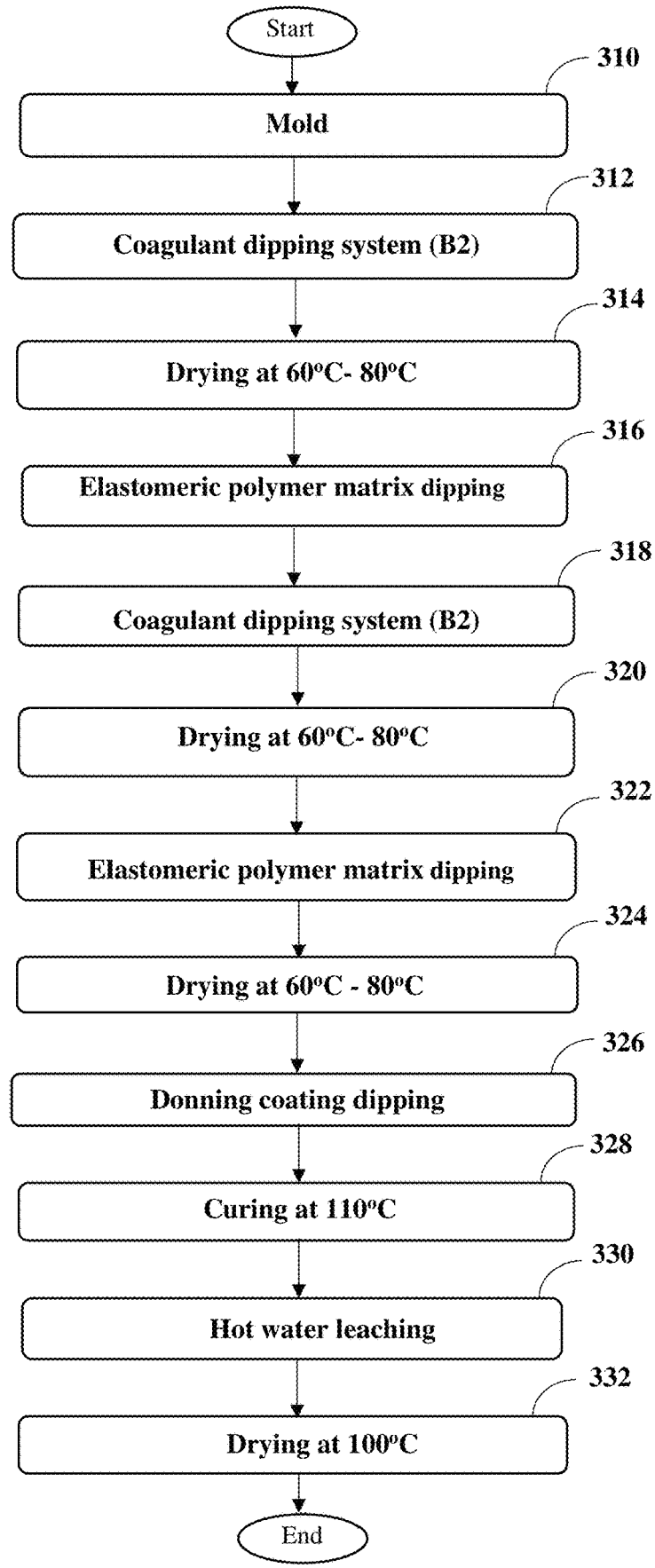
FIG. 3 illustrates a method of making an eco-friendly wearable article, according to an embodiment of the present invention.

In accordance with an embodiment of the present invention, a method 300 of making an eco-friendly wearable article is illustrated in FIG. 3. First a mold of the article is provided 310 and dipped into a coagulant dipping system 312 with an immersion time of preferably 12 seconds, followed by a dwell time of 10 seconds; followed by withdrawal time of 15 seconds. Preferably the coagulant dipping system comprises a nutrient complex capable of efficiently able to reduce or eliminate methane gas emission during biodegradation of the article. In a preferred embodiment of the present invention, the nutrient complex comprises ferrous sulphate present in a concentration of at least 0.009 µg/cm², cupric chloride present in a concentration of at least 0.003 µg/cm², and magnesium sulphate present in a concentration of at least 0.083 µg/cm².

More preferably, the nutrient complex is made of anionic sulphate ions and cationic salts of iron(II) and copper(II) having concentrations of iron(II) ranging from about ($4 \times 10^{-6}$-$40 \times 10^{-6}$ mol/L), copper(II) ($1 \times 10^{-6}$-$10 \times 10^{-6}$ mol/L), and sulphate ions ($6 \times 10^{-2}$-$2.4 \times 10^{-1}$ mol/L) respectively. Mixtures of iron(II) sulphate, copper(II) chloride and magnesium(II) sulphate were prepared at different concentrations as shown in Table 1. In a most preferred embodiment of the present invention, the anions and cations from the nutrient complex preferably are present as free ions such that they are readily available on a surface of the article, to interact with methanotrophs during biodegradation.

Prepared coagulants were then tested for methane oxidation efficiency, by spiking 10 ml of each coagulant separately, to a 2 ml of leachate taken from a 1 year old landfill.

The bottles were swept with nitrogen gas for 15 mintues and injected 100 ppm of methane gas. The bottles with leachate mixture were then incubated at 37° C.±2 at 130 rpm for 7 days. At the end of the 7th day, the amount of methane remaining in the mixture was quantified by gas chromatography. Methane oxidation was most efficient in coagulant B, which is 71% (Table 2). Results revealed that higher ion content (coagulant C) led to decrease the methane oxidation, most likely due to copper ions or other metabolites that may have reached toxic levels for the methanotrophs present in the leachate.

In accordance with the present invention, coagulant system B was considered as the preferred ion combination to introduce the nutrient complex into the eco-friendly wearable article. Preferably, the eco-friendly wearable article is an elastomeric article. The article was made using the coagulant system B according to chemical composition in Table 4, gave a thickness of 0.02 mm, which had poor stretchability.

In an embodiment of the present invention, in order to optimize the adequate thickness of the eco-friendly wearable elastomeric article to improve its stretchability, calcium(II) chloride was added to the coagulant system B, preferably at 3.75 mol/L, which improved the article thickness up to 0.15 mm (Table 3).

The optimized coagulant system B2, was then re-evaluated for methane oxidation efficiency in order to verify the impact of added calcium(II) chloride on the activity of the methanotrophs. 22 ppm of methane was detected after 7 days, indicating that 72% of methane had been converted, verifying that the addition of calcium(II) chloride did not have negative impact on the methane metabolism activity of methanotrophs. The optimized coagulant system B2, was then used as the preferred coagulation system for article preparation.

Next, according to a preferred embodiment of the present invention, the mold is dried 314 at a temperature from about 60° C. to about 80° C. for about 10 minutes after coagulant dipping 312 in coagulant B2, and then immersed by dipping into an elastomeric polymer matrix 316 (Table 4). Preferably the steps of dipping, drying and dipping into an elastomeric polymer matrix are repeated as shown in FIG. 3, by the process steps of coagulant dipping 318, drying 320 and dipping into an elastomeric polymer matrix 322 and are recommended for multiples times, preferably two times, in order to enrich the article with the nutrient complex which is in the coagulant to form an elastomeric layer comprising the nutrient complex.

Typically, the elastomeric polymer matrix contains biodegradative additives, accelerators ZDEC (Zinc diethyl dithiocarbamate), antioxidants, sulphur and other additives that facilitate biodegradation of an elastomeric article.

Due to the presence of cations in the coagulant B2, the negatively charged elastomeric polymer will be coagulated to form a gel.

According to various embodiments of the present invention, the articles were prepared according to Examples 1 to 5.

Next, the articles preferably are dried 324 from about 60° C. to about 80° C. for about 20 minutes, prior to treatment by dipping with a donning coating 326 selected from the group consisting of synthetic polyisoprene rubber, silicone emulsion, and polyurethane. In a preferred embodiment of the present invention, the donning coating is also composed of the nutrient complex capable of efficiently able to reduce or eliminate methane gas emission during biodegradation of the article, the nutrient complex in the donning coating is made of anionic sulphate ions and cationic salts of iron(II) and copper(II) having concentrations of iron(II) of about ($20\times10^{-6}$ mol/L), copper (II) of about ($5\times10^{-6}$ mol/L) and sulphate ions of about ($1.2\times10^{-1}$ mol/L). In a most preferred embodiment of the present invention, the anions and cations from the nutrient complex preferably are present as free ions such that they are readily available on a surface of the article, to interact with methanotrophs during biodegradation.

In an embodiment of the present invention, once the elastomeric article has been coated with the donning coating, the article is then cured 328 at a temperature of about 110±2° C. At this temperature polymer cros slinking can occur forming a cured elastomeric article. Next, the outside surface of the cured elastomeric article can then be placed in a hot water leaching system 330 for about 1-2 minutes to remove excess accelerators, followed by drying the article 332 at about 100° C. to obtain the finished eco-friendly wearable article.

In the most preferred embodiment of the present invention, the finished eco-friendly wearable article contains a nutrient complex within and inside the surface of the article, and is then stripped off from the mold.

In yet another embodiment of the present invention, each article was tested to quantify the iron(II) and copper(II) at multiple applications of the coagulant determined using inductively coupled plasma mass spectrometry method as described by [Sebastien Rolere et al.] and herein incorporated by reference in its entirety. The sulphate ion content in the finished articles was quantified as described by [AWWA, WEF, APHA, 1998] herein incorporated by reference in its entirety.

Table 5 shows the amount of cations and anions present in the eco-friendly wearable article according to the multiple application of the coagulant. Referring to Table 5, iron (II) copper(II) and sulphate content was 0.004 µg/cm$^2$, 0.001 µg/cm$^2$, 0.033 µg/cm$^2$ respectively, after single dipping of the coagulant. After application of two coagulant dips, iron (II) copper(II) and sulphate content increased from (0.004 µg/cm$^2$ to 0.009 µg/cm$^2$), (0.001 g/cm$^2$-0.003 g/cm$^2$), and (0.033 g/cm$^2$-0.083 g/cm$^2$) respectively.

Further increase in the number of coagulant dips gave only a marginal increment of the ion content in the article. Ion content was also evaluated in the article which was treated with 2.0% phyllosilicate clay mineral as another preferred embodiment of the present invention (Table 5). Incoming cations and anions from the coagulant had been adsorbed to the montmorillonite clay, where clays contain a large surface area, and high retention capability giving a significant increase in the ion content compared to Examples 1, 2, 3 and 4. The eco-friendly wearable elastomeric articles made according to Examples 1, 2, 3, 4 and 5 were further evaluated to determine the articles methane emission during anaerobic biodegradation in a landfill environment. Evaluations were compared to a control article which had no iron(II), no copper(II) and no sulphate ions in the coagulant.

Articles were tested according to (ASTM D 5511). Articles were placed under anaerobic environment with an anaerobic inoculum derived from an operating anaerobic digester with municipal solid waste, having a homogeneous organic fraction of less than 60 mm. Final dry matter content of the experimental mixture was set to ~45% and incubation was carried out at 37±2° C. The test conditions matched with real temperature conditions in a landfill, where both methanogenic bacteria and methanotrophic bacteria shows an optimum activity between 30-40° C.

Table 6.2 shows the actual methane gas amount emitted from each article made according to Examples 1, 2, 3, 4 and 5. Actual methane amount refers to [Sample$_{Methane}$-Blank$_{methane}$] and [Control$_{Methane}$-Blank$_{methane}$].

Referring to Table 7, the articles made according to Examples 2 and 5 had 80% and 85% less methane emissions respectively, compared to the control article without the nutrient complex after 21 days of biodegradation. Similarly, Examples 3 and 4 also had a marginal efficiency, indicating that the nutrient complex in the article had facilitated the methane metabolism by methanotrophs. However, articles made with only one coagulant dip had higher methane emissions, and gave only 52% methane reduction compared to control articles without the nutrient complex. Given that there was no significant change in methane emissions, in articles made according to Examples 3 and 4, two applications of the coagulant are adequate and therefore Example 2 is the preferable embodiment of the present invention.

The article having the said functional benefit (methane oxidation in landfill) does not exhibited significant alterations in mechanical properties such as unaged and aged tensile and abrasion (Tables 8, 9 and 10). After aging for seven days at 70° C. tensile properties remained unchanged.

TABLE 1

Selection of optimum ion concentrations for efficient methane oxidation

| coagulant system | Iron(II) sulphate (mol/L) | Copper(II) Chloride (mol/L) | Magnesium(II) sulphate (mol/L) |
|---|---|---|---|
| A | $4 \times 10^{-6}$ | $1 \times 10^{-6}$ | $6 \times 10^{-2}$ |
| B | $20 \times 10^{-6}$ | $5 \times 10^{-6}$ | $1.2 \times 10^{-1}$ |
| C | $40 \times 10^{-6}$ | $10 \times 10^{-6}$ | $2.4 \times 10^{-1}$ |

TABLE 2

Methane oxidation efficiency

| coagulant system | Methane input | Methane output | Methane oxidation |
|---|---|---|---|
| A | 100 ppm | 55 ppm | 45% |
| B | 100 ppm | 23 ppm | 71% |
| C | 100 ppm | 88 ppm | 12% |
| B2 | 100 ppm | 22 ppm | 72% |

TABLE 3

Optimizing the coagulant system for thickness gain of the article

| Proposed coagulant system | Iron(II) sulphate (mol/L) | Copper(II) Chloride (mol/L) | Magnesium(II) sulphate (mol/L) | Calcium(II) Chloride (mol/L) | Thickness of the article |
|---|---|---|---|---|---|
| B1 | $20 \times 10^{-6}$ | $5 \times 10^{-6}$ | $1.2 \times 10^{-1}$ | 1.5 | 0.04 mm |
| B2 | $20 \times 10^{-6}$ | $5 \times 10^{-6}$ | $1.2 \times 10^{-1}$ | 3.75 | 0.15 mm |

TABLE 4

Elastomeric polymer matrix of the Eco-friendly wearable article

| Total solid content | | Dry Qty/phr |
|---|---|---|
| 43.5 | Nitrile latex | 100.000 |
| 5 | KOH | 1.000 |
| 10 | Surfactant | 0.500 |
| 50 | Sulphur | 2.000 |
| 49.99 | ZnO | 1.000 |
| 48.9 | ZDEC | 0.300 |
| 50 | Antioxidant | 0.500 |
| 10 | Pigment | 0.400 |
| 5 | Biodegradative additive | 0.100 |
| | Total | 105.800 |

TABLE 5

Examples of present invention (Ion content, varying the no of (B2) coagulant dips)

| Examples | No of coagulant dips | Concentration of the ions in the article ($\mu g/cm^2$) | | |
|---|---|---|---|---|
| | | Iron(II) | Copper(II) | sulphate |
| Example 1 | 1 | 0.004 | 0.001 | 0.033 |
| Example 2 | 2 | 0.009 | 0.003 | 0.083 |
| Example 3 | 3 | 0.011 | 0.003 | 0.100 |
| Example 4 | 4 | 0.011 | 0.003 | 0.104 |
| Example 5 | 2 + 2% clay | 0.015 | 0.004 | 0.133 |

Figure 4:
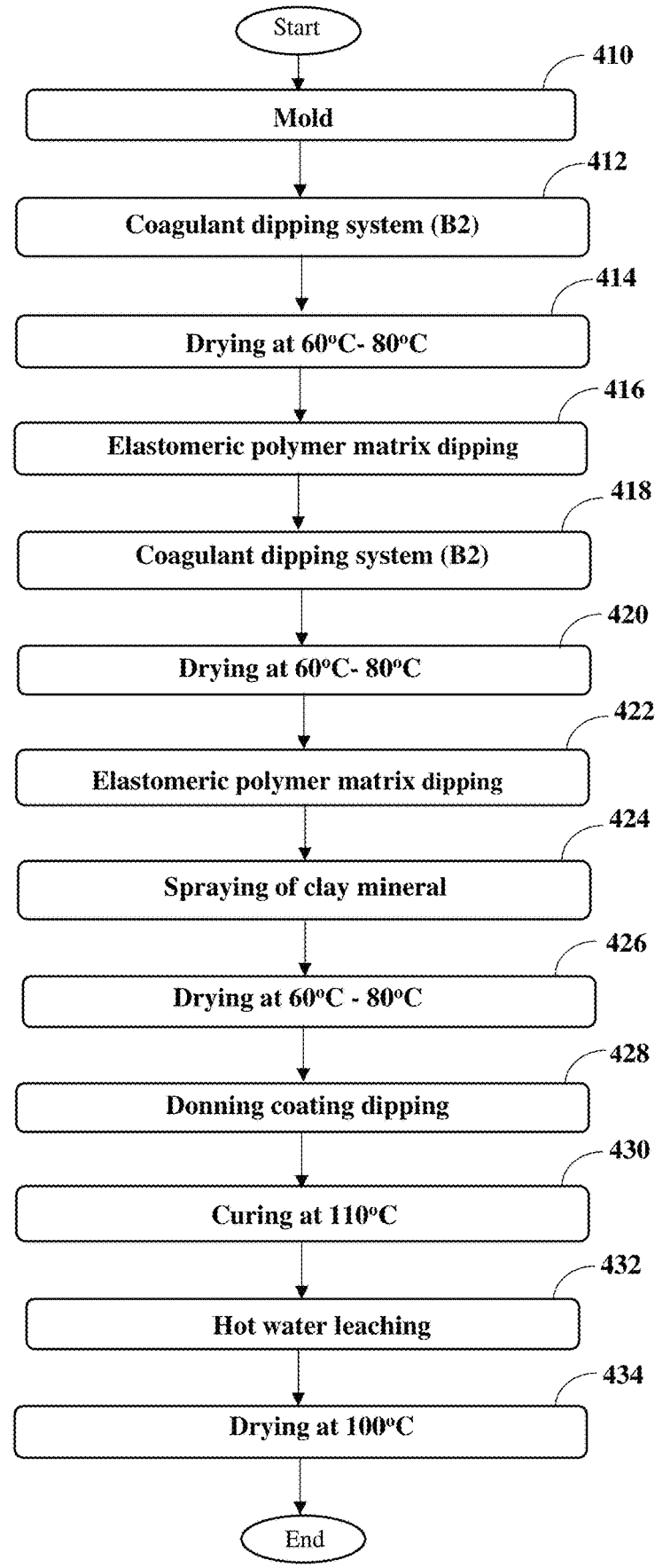
FIG. 4 illustrates an alternative method of making an eco-friendly wearable article, according to an embodiment of the present invention.
Figure 5:
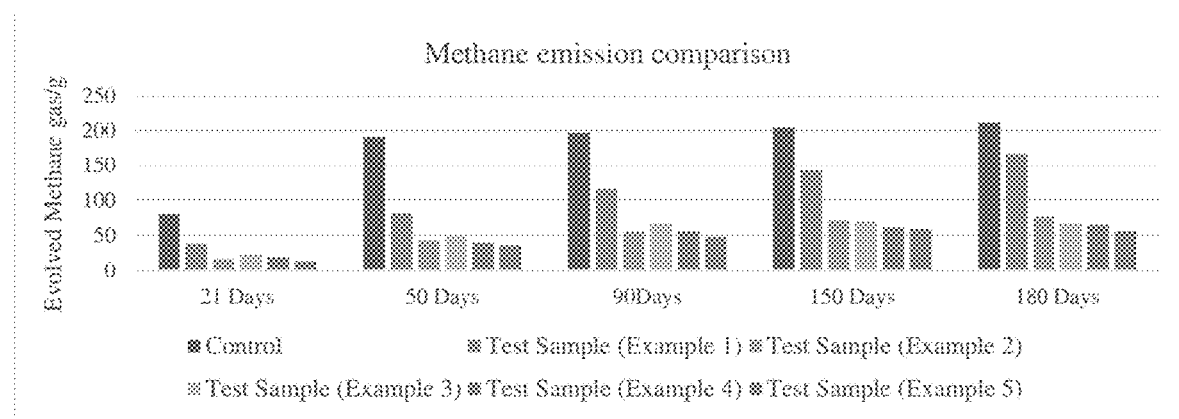
FIG. 5 illustrates methane emission comparison according to an embodiment of the present invention (after deducting inoculum blank from control and test sample).

In yet an alternative method 400 of making an eco-friendly wearable article of the present invention is illustrated in FIG. 4. First a mold of the article is provided 410 and dipped into a coagulant dipping system 412 with an immersion time of preferably 12 seconds, followed by a dwell time of 10 seconds; followed by withdrawal time of 15 seconds. Preferably the coagulant dipping system comprises a nutrient complex capable of efficiently reduce or eliminate methane gas emission during biodegradation of the article. Preferably, the nutrient complex is made of anionic sulphate ions and cationic salts of iron(II) and copper(II) having concentrations of iron(II) ranging from about ($4\times10^{-6}$-$40\times10^{-6}$ mol/L), copper(II) ($1\times10^{-6}$-$10\times10^{-6}$ mol/L), and sulphate ions ($6\times10^{-2}$-$2.4\times10^{-1}$ mol/L) respectively.

Next, according to a preferred embodiment of the present invention, the mold is dried 414 at a temperature from about 60° C. to about 80° C. for about 10 minutes after coagulant dipping 412 in coagulant B2 and then immersed by dipping into an elastomeric polymer matrix 416, the elastomeric polymer matrix containing biodegradative additives, accelerators ZDEC (Zinc diethyl dithiocarbamate), antioxidants, sulphur and other additives.

Due to the presence of cations in the coagulant B2, the negatively charged elastomeric polymer will be coagulated to form a gel.

Preferably the steps of dipping, drying and dipping into an elastomeric polymer matrix are repeated as shown in FIG. 4, by process steps of coagulant dipping 418, drying 420 and dipping into an elastomeric polymer matrix 422 and are recommended for multiples times, preferably two times, in order to enrich the article with the nutrient complex which is in the coagulant; to form an elastomeric layer comprising the nutrient complex.

In yet another preferred embodiment of the present invention, the coagulated elastomeric article can be sprayed with a phyllosilicate clay mineral 424. Typically, the phyllosilicate clay mineral comprises montmorillonite (MMT) having a total solid content from between about 1.0% to about 5.0%; more preferably between about 2.0 to about 4.5%. Typically, the phyllosilicate clay mineral can be sprayed on to the coagulated elastomeric article at a fixed time length. In an embodiment of the present invention, it is preferable to spray the clay mineral for 5 about seconds for uniform coverage of the elastomeric article mold. Excess of cations and anions that have migrated to the elastomeric article surface will be adsorbed to the clay mineral. Due to the large surface area and high retention capability, clay minerals typically show outstanding adsorption performances for metal ions. In various embodiments of the present invention, articles were prepared according to Examples 1 to 5.

Next, articles coated with the clay mineral preferably are dried 426 from about 60° C. to about 80° C. for about 20 minutes, prior to treatment by dipping with a donning coating 428 selected from the group consisting of synthetic polyisoprene rubber, silicone emulsion, and polyurethane. In a preferred embodiment of the present invention, the donning coating is also composed of the nutrient complex capable of efficiently able to reduce or eliminate methane gas emission during biodegradation of the article, the nutrient complex in the donning coating is made of anionic sulphate ions and cationic salts of iron(II) and copper(II) having concentrations of iron(II) of about ($20\times10^{-6}$ mol/L), copper (II) of about ($5\times10^{-6}$ mol/L) and sulphate ions of about ($1.2\times10^{-1}$ mol/L). In a most preferred embodiment of the present invention, the anions and cations from the nutrient complex preferably are present as free ions such that they are readily available on a surface of the article, to interact with methanotrophs during biodegradation.

In an embodiment of the present invention, the article can be coated with a donning coating by dipping 428 wherein the donning coating is selected from the group consisting of synthetic polyisoprene rubber, silicone emulsion, and polyurethane. In a most preferred embodiment of the present invention, the donning coating can also be composed of a nutrient complex made of anionic sulphate ions and cationic salts of iron(II) and copper(II) having concentrations of iron(II) of about ($20\times10^{-6}$ mol/L), copper (II) of about ($5\times10^{-6}$ mol/L) and sulphate ions of about ($1.2\times10^{-1}$ mol/L). More preferably, the nutrient complex comprises anionic sulphate ions and cationic salts of iron(II) and copper(II). In a most preferred embodiment of the present invention, the anions and cations from the nutrient complex preferably are present as free ions such that they are readily available on a surface of the article, to interact with methanotrophs during biodegradation.

In an embodiment of the present invention, once the elastomeric article has been coated with the donning coating, the article can then be cured 430 at a temperature of about 110±2° C. At this temperature polymer cros slinking can occur forming a cured elastomeric article. Next, the outside surface of the cured elastomeric article can then be placed in a hot water leaching system 432 for about 1-2 minutes to remove excess accelerators, followed by drying the article 434 at about 100° C. to obtain the finished eco-friendly wearable article.

In the most preferred embodiment of the present invention, the finished eco-friendly wearable article contains a nutrient complex within and inside the surface of the article, and is then stripped off from the mold.

In yet another embodiment of the present invention, each article was tested to quantify the iron(II) and copper(II) with montmorillonite clay (MMT) content, determined using inductively coupled plasma mass spectrometry method as previously described [Sebastien Rolere et al.] herein incorporated by reference in its entirety. The sulphate ion content in the finished articles was quantified as described by [AWWA, WEF, APHA, 1998]herein incorporated by reference in its entirety.

In an embodiment of the present invention, referring to Table 7, the article made according to Example 5, had 85% less methane emission after 21 days of biodegradation, compared to the control article without the nutrient complex.

TABLE 6

Methane emissions in the articles according to ASTM5511

| | 21 Days | 50 Days | 90 Days | 150 Days | 180 Days |
|---|---|---|---|---|---|
| 6.1 Evolved Methane gas content/g | | | | | |
| Blank (Inoculum) | 88.26 | 98.85 | 101.8 | 102.2 | 103.4 |
| Control | 168.31 | 289.82 | 298.8 | 306.1 | 314.2 |
| Test Sample (Example 1) | 126.35 | 180.25 | 217.5 | 245.2 | 270.2 |
| Test Sample (Example 2) | 104.23 | 141.25 | 157.5 | 173.2 | 180.2 |
| Test Sample (Example 3) | 110.43 | 147.65 | 169.1 | 172.1 | 170.3 |
| Test Sample (Example 4) | 106.55 | 137.65 | 157.1 | 163.1 | 168.1 |
| Test Sample (Example 5) | 100.66 | 135.35 | 149.1 | 161.20 | 159.23 |
| 6.2 Actual Methane gas amount emitted from control and test samples/g | | | | | |
| Control (un-treated with nutrient complex) | 80.05 | 190.97 | 197.02 | 203.9 | 210.77 |
| Test Sample (Example 1) | 38.09 | 81.4 | 115.65 | 142.93 | 166.74 |
| Test Sample (Example 2) | 15.97 | 42.4 | 55.65 | 70.93 | 76.74 |
| Test Sample (Example 3) | 22.17 | 48.8 | 67.30 | 69.89 | 66.91 |
| Test Sample (Example 4) | 18.29 | 38.80 | 55.28 | 60.89 | 64.71 |
| Test Sample (Example 5) | 12.4 | 34.80 | 47.28 | 58.89 | 55.71 |

TABLE 7

Methane emission reduction comparison compared to control

| | Example 1 | Example 2 | Example 3 | Example 4 | Example 5 |
|---|---|---|---|---|---|
| 21 Days | 52% | 80% | 72% | 77% | 85% |
| 50 Days | 57% | 78% | 74% | 80% | 82% |
| 90 Days | 41% | 72% | 66% | 72% | 76% |
| 150 Days | 30% | 65% | 66% | 70% | 71% |
| 180 Days | 21% | 64% | 68% | 69% | 74% |

TABLE 8

Unaged tensile property test data of example 2
Test Standard - ASTM D 412

| Sample replicates | Article thickness (mm) | Tensile strength (Mpa) | Elongation at Break (%) |
|---|---|---|---|
| 1 | 0.13 | 15.97 | 720.00 |
| 2 | 0.13 | 14.44 | 600.00 |
| 3 | 0.13 | 14.79 | 588.00 |
| 4 | 0.13 | 19.14 | 680.00 |
| Min | 0.13 | 14.44 | 588.00 |
| Max | 0.13 | 19.14 | 720.00 |
| Average | 0.13 | 16.08 | 647.00 |

TABLE 9

Aged tensile property test data of example 2
Test Standard - ASTM D 412

| Sample replicates | Article thickness (mm) | Tensile strength (Mpa) | Elongation at Break (%) |
|---|---|---|---|
| 1 | 0.13 | 15.97 | 720.00 |
| 2 | 0.13 | 14.44 | 600.00 |
| 3 | 0.13 | 14.79 | 588.00 |
| 4 | 0.13 | 19.14 | 680.00 |
| Min | 0.13 | 14.44 | 588.00 |
| Max | 0.13 | 19.14 | 720.00 |
| Average | 0.13 | 16.08 | 647.00 |

TABLE 10

Abrasion test data of example 2
Test Standard - ASTM D 3389
Type of wheel - H-18
Test load - 500 g

| Sample replicates | Article thickness (mm) | Breakthrough Cycles |
|---|---|---|
| 1 | 0.13 | >1000 |
| 2 | 0.13 | >1000 |
| 3 | 0.13 | >1000 |
| 4 | 0.13 | >1000 |
| Average | 0.13 | >1000 |

In summary, the present invention provides an eco-friendly wearable article having a nutrient complex that is built into the article itself to facilitate in-situ oxidation of methane by methanotrophs, during anaerobic biodegradation in a landfill.

Further, this eco-friendly wearable article having this nutrient complex, can help suppress methane emission from a biodegradable article itself, thus potentially eliminating costly complex processing treatment taking place during methane gas collection in landfills.

Throughout the description and drawings, example embodiments are given with reference to specific configurations. It can be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. An eco-friendly wearable article comprising at least two components including: a nutrient complex and an elastomeric mixture;

wherein the nutrient complex comprises anionic sulphate ions and cationic salts of iron (II) and copper (II) that are present as free ions such that they are available on a surface of the article, to interact with at least one selected from the group consisting of methane-consuming microorganisms, methanotrophs, methanotrophic microorganisms, and methanotrophic organisms including species which feed on or consume methane present in landfill, to effectively reduce methane gas emissions during landfill biodegradation process of the article.

2. The eco-friendly wearable article of claim 1, wherein the nutrient complex comprises ferrous sulphate, present in a concentration of at least 0.009 µg/cm$^2$, cupric chloride present in a concentration of at least 0.003 µg/cm$^2$, and magnesium sulphate present in a concentration of at least 0.083 µg/cm$^2$.

3. The eco-friendly wearable article according to claim 1, wherein the eco-friendly wearable article comprises an elastomeric material.

4. The eco-friendly wearable article according to claim 1, wherein the eco-friendly wearable article is a disposable glove.

5. A method of making an eco-friendly wearable article according to claim 1, the method comprising the steps of:
   a) providing a mold of the article;
   b) dipping the mold into the nutrient complex;
   c) dipping the mold into the elastomeric mixture;
   d) repeating steps b) and c) to form an elastomeric layer comprising the nutrient complex;
   e) drying the elastomeric layer;
   f) dipping the elastomeric layer into a donning coating to form a donning coated elastomeric layer;
   g) curing the donning coated elastomeric layer; and,
   h) drying the donning coated elastomeric layer to form the eco-friendly wearable article.

6. The method of making the eco-friendly wearable article according to claim 5, wherein the nutrient complex comprises ferrous sulphate, present in a concentration of at least 0.009 µg/cm$^2$, cupric chloride present in a concentration of at least 0.003 µg/cm$^2$, and magnesium sulphate present in a concentration of at least 0.083 µg/cm$^2$.

7. The method of making the eco-friendly wearable article according to claim 5, wherein the method further comprises the step of spraying the elastomeric layer with a phyllosilicate clay mineral prior to drying step.

8. The method of making the eco-friendly wearable article according to claim 7, wherein the phyllosilicate clay mineral is present in a total solid content between about 2.0% to about 4.5%.

9. The method of making the eco-friendly wearable article according to claim 5, wherein the donning coating further comprises the nutrient complex.

10. The method of making the eco-friendly wearable article according to claim 5, wherein the drying steps occur at a temperature from about 60° C. to about 80° C.

11. The method of making the eco-friendly wearable article according to claim 5, wherein the curing step is at a temperature between about 100° C. to about 110° C.

12. The method of making the eco-friendly wearable article according to claim 5, wherein the eco-friendly wearable article is a disposable glove.

13. The eco-friendly wearable article according to claim 5, wherein the nutrient complex facilitates methane metabolism enzymatic activity of the at least one selected from the group consisting of methane-consuming microorganisms, methanotrophs, methanotrophic microorganisms, and methanotrophic organisms including species which feed on or consume methane present in the landfill to effectively oxidize methane gas which is released by the eco-friendly wearable article during landfill biodegradation process.

14. The eco-friendly wearable article according to claim 1, wherein the nutrient complex facilitates methane metabolism enzymatic activity of the at least one selected from the group consisting of methane-consuming microorganisms, methanotrophs, methanotrophic microorganisms, and methanotrophic organisms including species which feed on or consume methane present in the landfill to effectively oxidize methane gas which is released by the eco-friendly wearable article during landfill biodegradation process.

15. An eco-friendly wearable article comprising at least two components including: a nutrient complex and an elastomeric mixture; wherein
   the nutrient complex comprises ferrous sulphate, present in a concentration of at least 0.009 µg/cm$^2$, cupric chloride present in a concentration of at least 0.003 µg/cm$^2$, and magnesium sulphate present in a concentration of at least 0.083 µg/cm$^2$;
   the nutrient complex designed to effectively reduce methane gas emission during landfill biodegradation process of the article.

16. The eco-friendly wearable article according to claim 15, wherein the eco-friendly wearable article comprises an elastomeric material.

* * * * *